(12) United States Patent  (10) Patent No.: US 9,193,265 B2
Schneider et al.  (45) Date of Patent: Nov. 24, 2015

(54) OPERATOR CONTROL ELEMENT

(71) Applicant: AUDI AG, Ingolstadt (DE)

(72) Inventors: Johann Schneider, Wettstetten (DE); Michael Wachinger, Winkelhausen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/358,813

(22) PCT Filed: Oct. 19, 2012

(86) PCT No.: PCT/EP2012/004392
§ 371 (c)(1),
(2) Date: May 16, 2014

(87) PCT Pub. No.: WO2013/072000
PCT Pub. Date: May 23, 2013

(65) Prior Publication Data
US 2014/0339849 A1 Nov. 20, 2014

(30) Foreign Application Priority Data
Nov. 16, 2011 (DE) .......................... 10 2011 118 723

(51) Int. Cl.
*H01H 3/00* (2006.01)
*H01H 13/00* (2006.01)
(Continued)

(52) U.S. Cl.
CPC ................ *B60K 37/06* (2013.01); *H01H 21/22* (2013.01); *H01H 2021/225* (2013.01)

(58) Field of Classification Search
CPC ........... H01H 3/00; H01H 13/00; H01H 1/00; H01H 3/02; H01H 3/04; H01H 3/06; H01H 3/12; H01H 9/00; H01H 9/02; H01H 13/04; H01H 13/70; H01H 21/00; H01H 21/04; H01H 21/06; H01H 23/00; H01H 23/02; H01H 23/04; H01H 23/14; H01H 23/24; H01H 23/28; H01H 23/26; H01H 25/00; H01H 2003/00; H01H 2221/00; H01H 2221/012; H01H 2221/016; H01H 2223/00; H01H 2223/01; H01H 2223/034; H01H 2223/0345; H01H 2223/056; H01H 2223/012; H01H 2231/016; H01H 2231/026; H01H 2231/052; H01H 2233/04; H01H 2233/03; H01H 2233/07; H01H 2239/05; H01H 2300/008; H01H 2300/01; H01H 2300/012; H01H 2233/05
USPC .......................................................... 200/339
See application file for complete search history.

(56) References Cited

U.S. PATENT DOCUMENTS 5,557,080 A    9/1996  Hayakawa
6,843,356 B2 * 1/2005  Oster ........................... 192/215
(Continued)

FOREIGN PATENT DOCUMENTS

DE    19507952    9/1995
DE    10325850    12/2004
(Continued)

OTHER PUBLICATIONS

WIPO English Language Translation of International Preliminary Report on Patentability for PCT/EP2012/004392, Downloaded from WIPO Website May 16, 2014, 5 pages.
(Continued)

*Primary Examiner* — Edwin A. Leon
*Assistant Examiner* — Anthony R. Jimenez
(74) *Attorney, Agent, or Firm* — Staas & Halsey LLP

(57) ABSTRACT

An operator control element system for a vehicle has an operator control element. The operator control element has a plurality of operator control areas and a region which faces an operator and a region which is located in a vehicle trim panel. The operator control element is distinguished in that it is mounted such that it can pivot about a rotation axis.

22 Claims, 1 Drawing Sheet

(51) Int. Cl.
*B60K 37/06* (2006.01)
*H01H 21/22* (2006.01)

(56) References Cited

U.S. PATENT DOCUMENTS

| | | | | |
|---|---|---|---|---|
| 7,294,801 | B2* | 11/2007 | Shimizu | 200/302.3 |
| 2007/0227795 | A1 | 10/2007 | Dorn et al. | |
| 2008/0116048 | A1 | 5/2008 | Straber et al. | |

FOREIGN PATENT DOCUMENTS

| | | |
|---|---|---|
| DE | 10343134 | 5/2005 |
| DE | 102006051028 | 5/2008 |
| DE | 102008047346 | 4/2010 |
| DE | 102011118723.9 | 11/2011 |
| EP | 1705553 | 9/2006 |
| GB | 1000853 | 8/1965 |
| GB | 2441340 | 3/2008 |
| WO | PCT/EP2012/004392 | 10/2012 |

OTHER PUBLICATIONS

German Office Action for German Priority Patent Application No. 10 2011 118 723.9, issued Jun. 29, 2012, 5 pages.

English Language International Search Report for PCT/EP2012/004392, mailed Jun. 18, 2013, 2 pages.

* cited by examiner

OPERATOR CONTROL ELEMENT

CROSS REFERENCE TO RELATED APPLICATIONS

This application is based on and hereby claims priority to International Application No. PCT/EP2012/004392 filed on Oct. 19, 2012 and German Application No. 10 2011 118 723.9 filed on Nov. 16, 2011, the contents of which are hereby incorporated by reference.

BACKGROUND

The present invention relates to a control element.

With the generic control element disclosed in DE 103 43 134 A1 the control element is fixed in position and joined to the surface of a vehicle panel so as to be approximately flush therewith.

SUMMARY

One potential object is to provide a control element with simple operation and a wide range of uses.

The inventors propose a control element system in which the control element is mounted so as to pivot about an axis of rotation that is parallel to a surface of a vehicle panel. The pivot angle is thereby preferably between 5 and 30°. With such an embodiment of the control element it can be used at any point in the entire interior paneling of the vehicle, which extends the use of control elements in vehicles.

In one embodiment the region of the control element disposed in the vehicle panel is mounted between operation detection sensors. Thus the region of the control element disposed in the vehicle panel presses against a sensor that detects an operation when the control element is operated by an operator, which causes pivoting of the control element about the axis of rotation, and the sensor generates a sensor signal. Advantageously, the operation detection sensors are in the form of pressure sensors, whereas of course other sensors are also conceivable as operation detection sensors. With this embodiment, an easily handled control element results that functions similarly to a piano key.

Advantageously, the region of the control element facing the operator protrudes out of the surface of the vehicle panel. It is particularly advantageous if the protrusion lies in the range from 3 cm to 8 cm. This design of the control element increases the accessibility to the control element and thus also improves operability.

In an alternative embodiment an actuator is integrated within the control element, which imposes a movement on the control element when the control element is operated by the operator and thus produces tactile feedback to the operator. The actuator can e.g. be an electromagnetically driven actuator here. When the control element is operated an operation signal is passed to a control unit from the operation sensors. The control unit passes said operation signal to the actuator and triggers it.

Advantageously, the control fields, which can e.g. be in the form of press buttons or touch-sensitive surfaces, are disposed on the top and/or the bottom of the control element. With the control fields disposed on the top and the bottom of the region of the control element facing the operator, it is particularly advantageous if complementary control functions such as e.g. "increase volume" and "reduce volume" are disposed opposite each other, i.e. "increase volume" on the top and "reduce volume" on the bottom of the region of the control element facing the operator. The intuitive operation of the control element is improved with such an embodiment of the control element. Of course, the control fields can also have other associated functions, such as e.g. temperature regulation, ventilation regulation or radio transmitter.

In another embodiment the control element is disposed on a side wall of a central console or on a vehicle door.

Advantageously, the region of the control element facing the operator has a drop-shaped cross section.

In another embodiment the control element is in the form of a bar or of a lever.

The control element can be made of a plastic or a metal such as aluminum. In order to improve the presentation of individual control fields of the control element, it can be provided that the surfaces (in the case of plastic), which normally includes a dark cover layer, are lasered out at the control field borders and a light source such as e.g. an LED or OLED is integrated within the control element. Such an embodiment causes illumination of the border regions of the control fields. An indirect light feed by optical fibers into the control element is also conceivable, in order to be able to illuminate the border regions of the control fields.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
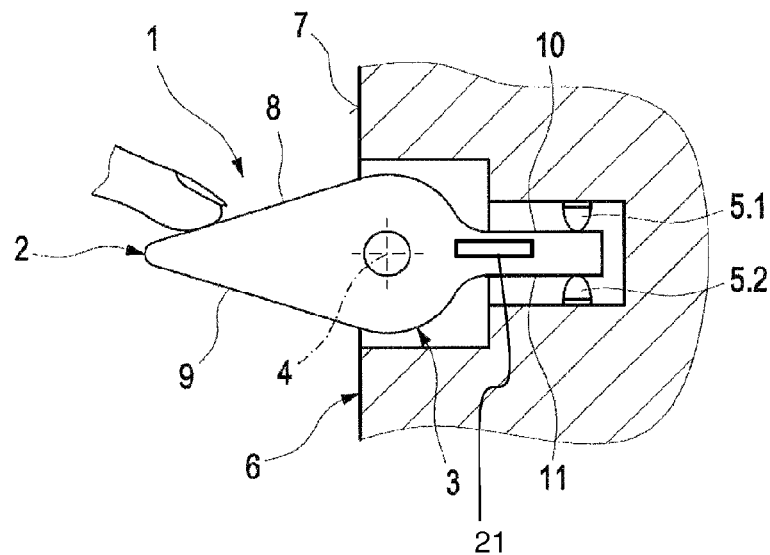
FIG. 1 shows an embodiment of the control element in a sectional view.

Reference will now be made in detail to the preferred embodiments of the present invention, examples of which are illustrated in the accompanying drawings, wherein like reference numerals refer to like elements throughout.

In the sectional view of FIG. 1 the control element 1 comprises a region 2 facing the operator that protrudes out of the vehicle panel 6 and a region 3 disposed in the vehicle panel 6. Here the region 2 facing the operator protrudes by 3 cm to 8 cm from the vehicle panel 6. The control element 1 is mounted so as to pivot about the axis of rotation 4, which runs parallel to a surface 7 of the vehicle panel 6. The pivot angle by which the control element pivots is in the range from 10° to 25° in this case. The region 3 of the control element 1 that is disposed in the vehicle panel 6 is mounted between operation detection sensors 5.1, 5.2. If the operator presses on a control field 12.1, 12.2, 12.3, 12.4, 12.5, 12.6 on the top 8 or the bottom 9 of the region 2 of the control element 1 facing the operator, then the control element 1 pivots about the axis of rotation 4 of the control element 1. As a result of said pivoting motion the region 3 of the control element 1 disposed in the vehicle panel 6 presses with one side 10, 11 on the operation detection sensors 5.1, 5.2, which are in the form of pressure sensors. The side 10, 11 that presses on the operation detection sensors 5.1, 5.2 depends on whether a control field 12.1, 12.2, 12.3, 12.4, 12.5, 12.6 of the top 8 or of the bottom 9 of the region 2 of the control element 1 facing the operator is operated. If a control field on the top 8 of the region 2 of the control element 1 facing the operator is operated, the side 10 of the region 3 of the control element 1 disposed in the vehicle panel 6 presses on the operation detection sensor 5.1. If a control field on the bottom 9 of the region 2 of the control element 1 facing the operator is operated, then the side 11 of region 3 of the control element 1 disposed in the vehicle panel 6 presses on the operation detection sensor 5.2. The operation detection sensors 5.1, 5.2 pass the operation signal to a control unit that is not shown, which then carries out the corresponding control function and controls an actuator 21 disposed in the control element 1. The actuator 21 produces tactile feedback to the operator when controlled by imposing on the entire control element a movement along the axis of rotation 4 of the control element, which can be detected by the operator.

Figure 2:
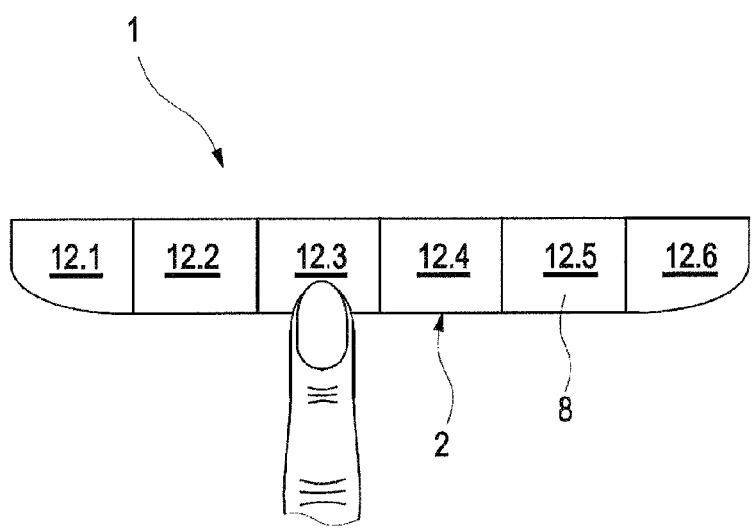
FIG. 2 shows a plan view of the control element.

FIG. 2 shows a plan view of the region 2 of the control element 1 facing the operator. A plurality of control fields 12.1 to 12.6 with different control functions is disposed on the top 8 of the region 2 of the control element 1 facing the operator. Here the control fields 12.1 to 12.6 are occupied by "positive" control functions such as e.g. increase volume, increase temperature, increase ventilation, or switch on the interior lighting.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV,* 69 USPQ2d 1865 (Fed. Cir. 2004).

The invention claimed is:

1. A control element system for a vehicle, comprising:
   a panel of the vehicle;
   a control element having an exterior region facing an operator and an interior region disposed in the panel of the vehicle, the control element being mounted so as to be pivotable about an axis of rotation, the control element having a plurality of control fields in the form of press buttons or touch-sensitive surfaces which are provided on a first side of the control element, wherein each of the control fields of the control element, when operated, causes the control element to pivot as a whole; and
   an actuator associated with the control element to produce movement of the control element, the actuator being triggered by operation of the control fields of the control element,
   wherein
   the first side of the control element is disposed in the exterior region of the control element, and a second side of the control element is disposed in the exterior region and opposes the first side of the control element, and
   the first and second sides run in respective planes that are substantially parallel to the axis of rotation.

2. The control element system as claimed in claim 1, wherein the axis of rotation runs parallel to a surface of the panel of the vehicle.

3. The control element system as claimed in claim 2, wherein the axis of rotation runs parallel to and in substantially in a same plane as the surface of the panel of the vehicle.

4. The control element system as claimed in claim 1, wherein the interior region of the control element is mounted between operation detection sensors.

5. The control element system as claimed in claim 4, wherein the operation detection sensors are pressure sensors.

6. The control element system as claimed in claim 5, wherein a sensor signal of the pressure sensors controls the actuator.

7. The control element system as claimed in claim 1, wherein
   the interior region of the control element is mounted between operation detection sensors, and
   when the control element pivots and the exterior region of the control element moves in a first direction, the interior region of the control element moves in a second direction opposite to the first direction to trigger one of the operation detection sensors.

8. The control element system as claimed in claim 1, wherein the exterior region of the control element protrudes out of a surface of the panel of the vehicle.

9. The control element system as claimed in claim 1, wherein the first side of the control element corresponds to a top side of the control element or a bottom side of the control element.

10. The control element system as claimed in claim 1, wherein
    the panel of the vehicle is a side wall of a center console, and
    the control element is disposed in the side wall of the center console.

11. The control element system as claimed in claim 1, wherein
    the panel of the vehicle is a vehicle door, and
    the control element is disposed in the vehicle door.

12. The control element system as claimed in claim 1, wherein the exterior region of the control element has an approximately drop-shaped cross section.

13. The control element system as claimed in claim 1, wherein the control element is formed as a switch panel.

14. The control element system as claimed in claim 1, wherein the control element is formed as a lever.

15. The control element system as claimed in claim 1, wherein
    each control field is associated with a different function of the vehicle, such that selective operation of the control fields activates different associated functions of the vehicle.

16. The control element system as claimed in claim 1, wherein
    a plurality of control fields in the form of press buttons or touch-sensitive surfaces are provided on the second side of the control element, and
    each control field provided on the first and second side is associated with a different function of the vehicle, such that selective operation of the control fields activates different associated functions of the vehicle.

17. The control element system as claimed in claim 16, wherein
    the control fields provided on the first and second sides are positioned such that complimentary functions are associated with the first and second sides of the control element, with positive activation functions being associated with the first side of the control element and negative activation functions being associated with the second side of the control element.

18. The control element system as claimed in claim 16, wherein
    the control fields provided on the first and second sides are positioned such that complimentary functions are associated with the first and second sides of the control element,
    the functions associated with the first side of the control element are selected from the group consisting of increasing volume, increasing temperature, increasing ventilation, and turning on of lighting, and
    the functions associated with the second side of the control element are selected from the group consisting of decreasing volume, decreasing temperature, decreasing ventilation, and turning off of lighting.

19. A control element system for a vehicle, comprising:
a panel of the vehicle;
a control element having an exterior region facing an operator and an interior region disposed in the panel of the vehicle, the control element being mounted so as to be pivotable about an axis of rotation, the control element having a plurality of control fields in the form of press buttons or touch-sensitive surfaces which are provided on a first side of the control element, wherein each of the control fields of the control element, when operated, causes the control element to pivot as a whole; and
an actuator associated with the control element to produce movement of the control element, the actuator being triggered by operation of the control fields of the control element,
wherein
the first side of the control element is disposed in the exterior region of the control element, and a second side of the control element is disposed in the exterior region and opposes the first side of the control element,
the first and second sides run in respective planes that are substantially parallel to the axis of rotation,
a plurality of control fields in the form of press buttons or touch-sensitive surfaces are provided on the second side of the control element,
a first function is associated with the at least one first control field and a second function is associated with the at least one second control field,
operating the at least one first control field and pivoting the control element in a first direction or a second direction positively or negatively activates the first function, respectively,
operating the at least one second control field and pivoting the control element in the first direction or the second direction positively or negatively activates the second function.

20. The control element system as claimed in claim 19, wherein
the interior region of the control element is mounted between operation detection sensors, and
pivoting the control element moves the exterior region of the control element in a direction opposite to the interior region of the control element, causing the interior region of the control element to trigger one of the operation detection sensors.

21. The control element system as claimed in claim 19, wherein
the axis of rotation is substantially horizontal,
the first side of the control element is an upper side of the control element,
an upward movement of the exterior region of the control element pivots the control element in the first direction and a downward movement of the exterior of the control element pivots the control element in the second direction, and
positive activation of the first and second functions is associated with the upward movement of the exterior region of the control element and negative activation of the first and second functions is associated with the downward movement of the exterior region of the control element.

22. The control element system as claimed in claim 1, wherein the actuator is an electromagnet, which causes the control element to provide haptic feedback to the operator when the operator contacts one or more of the control fields.

* * * * *